United States Patent [19]

Forschirm

[11] Patent Number: 5,641,824
[45] Date of Patent: Jun. 24, 1997

[54] THERMOPLASTIC POLYMER COMPOSITION WITH IMPROVED WEAR PROPERTIES

[75] Inventor: Alex Forschirm, Parsippany, N.J.

[73] Assignee: Hoechst Celanese Corporation, Somerville, N.J.

[21] Appl. No.: 597,334

[22] Filed: Feb. 6, 1996

Related U.S. Application Data

[63] Continuation of Ser. No. 396,047, Feb. 28, 1995, abandoned.

[51] Int. Cl.$^6$ .......................................... C08K 5/10
[52] U.S. Cl. ................ 524/311; 264/299; 264/300; 264/331.12; 264/331.17; 524/306; 524/310; 524/400; 524/427
[58] Field of Search ...................... 524/306, 310, 524/311, 400, 427; 264/299, 300, 331.12, 331.17

[56] References Cited

U.S. PATENT DOCUMENTS

| | | | |
|---|---|---|---|
| 4,126,593 | 11/1978 | Takahashi | 524/311 |
| 4,408,000 | 10/1983 | Lee | 524/315 |
| 4,409,351 | 10/1983 | Lee | 524/322 |
| 4,530,953 | 7/1985 | Yoshida | 524/311 |
| 4,670,508 | 6/1987 | Ohdaira et al. | 524/502 X |
| 4,960,813 | 10/1990 | Wadhwa et al. | 524/311 |
| 5,126,391 | 6/1992 | Yamamoto et al. | 524/311 X |
| 5,191,006 | 3/1993 | Matsumoto et al. | 524/311 X |
| 5,258,434 | 11/1993 | Hanabusa | 524/310 |
| 5,300,552 | 4/1994 | Hindi et al. | 524/502 X |
| 5,302,651 | 4/1994 | Kawashima et al. | 524/306 |
| 5,346,944 | 9/1994 | Hayashida et al. | 524/311 X |

*Primary Examiner*—Judy M. Reddick
*Attorney, Agent, or Firm*—James M. Hunter, Jr.

[57] ABSTRACT

A self-lubricating polymeric composition, characterized as a melt blend of a thermoplastic polymer and a lubricating system containing ultra high molecular weight polyethylenes, a polyester, acid metal salts, calcium salts, antioxidants and stabilizers. The composition may be prepared into shaped articles which exhibit improved surface wear resistance and coefficients of friction.

15 Claims, No Drawings

THERMOPLASTIC POLYMER COMPOSITION WITH IMPROVED WEAR PROPERTIES

This application is a continuation of application Ser. No. 08/396,047, filed on Feb. 28, 1995, now abandoned.

FIELD OF THE INVENTION

The present invention relates to self-lubricating, low wear compositions containing a thermoplastic polymer and lubricating system suitable for use as a molding resin to prepare shaped articles. Shaped articles prepared from the composition exhibit low friction properties as well as reduced surface wear under loads.

BACKGROUND OF THE INVENTION

Thermoplastic polymers, e.g., polyamides, polyesters, polyphenylene sulfide, polyoxymethylene, polyolefins, styrene polymers, and polycarbonates, are characterized as polymers that exhibit exceptional mechanical and electrical properties, as well as good moldability and chemical resistance. However, these polymers may exhibit inadequate tribological properties when utilized in some friction environments, e.g., plastic to metal, and plastic to plastic interfaces. While many lubricating compositions have been applied to thermoplastic polymers to improve friction and wear properties of shaped articles prepared therefrom, some applications prohibited the use of certain lubricants because of possible contamination, e.g., food handling, clothing preparation and volatile environments.

Attempts have been made to improve the friction properties and reduce the surface wear of articles prepared from thermoplastic polymers by incorporating lubricants directly into the polymer matrix prior to the fabrication of shaped articles therefrom. Many materials, including solid lubricants and fibers (e.g., graphite, mica, silica, talc, boron nitride and molybdenum sulfide), paraffin waxes, petroleum and synthetic lubricating oils, and other polymers (e.g., polyethylene and polytetrafluoroethylene) have been added to thermoplastic polymers to improve friction and wear properties. However, the addition of many of these additives in various combinations to thermoplastic polymers, while improving tribological properties have reduced other desirable physical and mechanical properties. Some additives have proven satisfactory for short terms at low speeds and loads. However, friction characteristics of many of these lubricants significantly deteriorate over long periods of time under increased loads.

There is a desire for a non-toxic, self-lubricating thermoplastic compositions possessing surface wear resistance and low friction properties under increasing loads over long periods of time. A suitable composition, when fabricated into a shaped article, should maintain the desired mechanical and physical properties long associated with thermoplastic polymers, and be safely utilized in food handling and clothing manufacturing industries.

SUMMARY OF THE INVENTION

The present invention relates to a self-lubricating composition suitable for forming a low friction, shaped article, characterized as a melt blend of from about 70 to about 99.5 weight percent of a thermoplastic polymer, and from about 30 to about 0.5 weight percent of a lubricating system, wherein said lubricating system may be characterized as an ultra high molecular weight polyolefin, pentaerythritol tetrastearate (PETS) and calcium carbonate. Processing aids that do not detract from the characteristics of the invention may be added to the composition to enhance physical properties and processing, e.g., dispersion of the lubricating system within the polymer matrix.

The composition may be formed into self-lubricating shaped articles, e.g., bearings, gears, cams, rollers, sliding plates, pulleys, levers, guides, conveyor links, etc., which exhibit good friction properties and are useful in numerous applications wherein parts exhibiting low friction and reduced wear properties are desirable.

DETAILED DESCRIPTION OF THE INVENTION

The invention is directed to a self-lubricating composition which may be fabricated into shaped articles exhibiting good friction properties. Generally, the composition may be characterized as an admixture of from about 70 to about 99.5 weight percent of a thermoplastic polymer and from about 30 to about 0.5 weight percent of a lubricating system. Typically, the composition may contain from about 85 to about 99 weight percent of the thermoplastic polymer and from about 15 to about 1 weight percent of the lubricating system. Preferably, the composition contains about 98 weight percent of the thermoplastic polymer and about 2 weight percent of the lubricating system, based on the total weight of the composition.

Thermoplastic polymer useful in the self lubricating composition of the present invention may be, generally, selected from polyamides, polyesters, polyphenylene sulfides, polyolefins, polyoxymethylenes, styrene polymers, and polycarbonates. Particular preferred thermoplastic polymer of the invention is polyoxymethylenes, i.e., polymeric acetals or oxymethylene polymers. Polyoxymethylenes exhibit physical and mechanical properties that make them suitable for many industrial applications.

Polyoxymethylenes, i.e., polyacetals or oxymethylene polymers useful in the present invention are generally characterized as having recurring oxymethylene units of the general formula:

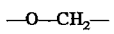

Polyoxymethylenes that are useful in making composition of the invention generally have a fairly high content of oxymethylene units, i.e., generally greater than about 85 percent. These materials are commercially available from a number of manufacturers as homopolymers, copolymers, terpolymers, and the like. These highly crystalline acetals, described briefly hereinbelow, are well known in the art and have been reviewed extensively. For example, a review of polymeric acetals entitled, "Acetal Resins," by T. J. Dolce and J. A. Grates, may be found in the Second Edition of *Encyclopedia of Polymer Science and Engineering*, John Wiley and Sons, New York, 1985, Vol. 1, pp. 42–61. Additional information on acetal polymers can be found in French Patent No. 1,221,148 as well as commonly assigned U.S. Pat. Nos. 3,027,352, 3,072,069, 3,147,234, and 3,210,318.

Typically, acetal homopolymers may be prepared by polymerizing anhydrous formaldehyde or trioxane. Oxymethylene homopolymers are typically stabilized against thermal degradation by end-capping with, for example, ester or ether groups, such as those derived from alkanoic anhydrides (e.g., acetic anhydride) or dialkyl ethers, (e.g., dimethyl ether) or by incorporating stabilizer compounds into the homopolymer.

Commercially available acetal homopolymer is made by polymerizing anhydrous formaldehyde in the presence of an initiator after which the polymer is end-capped by acetylation of the hemiacetal end groups with acetic anhydride in the presence of sodium acetate catalyst. Methods for making end-capped acetal homopolymers are taught in U.S. Pat. Nos. 2,786,994 and 2,998,409. Acetal homopolymers are well know in the art and are commercially available under the trademarks DELRIN® and TENAC®.

Polymeric acetals which have been found to be especially suitable for use in the composition of the present invention are crystalline oxymethylene copolymers having repeat units which consist essentially of oxymethylene groups interspersed with oxy (higher alkylene) groups of the general formula:

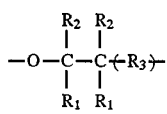

wherein each $R_1$ and $R_2$ is hydrogen, a lower alkyl group, or a halogen substituted lower alkyl group, each $R_3$ is a methylene, oxymethylene, lower alkyl or haloalkyl substituted methylene or lower alkyl or haloalkyl substituted oxymethylene group, and n is zero or an integer from one to three, inclusive. Each lower alkyl group preferably contains one or two carbon atoms. Oxymethylene groups generally will constitute from about 85 to 99.9 percent of the recurring units in such copolymers and are generally incorporated by ring-opening polymerization of trioxane in the presence of an acidic catalyst. The oxy(higher alkylene) groups are incorporated into the polymer by copolymerizing a cyclic ether or cyclic formal having at least two adjacent carbon atoms in the ring in addition to trioxane. The cyclic ether or formal is incorporated by the breaking of an oxygen-to-carbon linkage. The preferred oxy(higher alkylene) group is oxyethylene, having the formula:

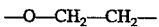

Oxyethylene may be incorporated into the polymer by copolymerization of ethylene oxide or 1,3-dioxolane with trioxane.

The preferred crystalline acetal copolymers, as described above which have a structure consisting essentially of oxymethylene and oxyethylene groups, are thermoplastic materials having a melting point of at least 150° C. They normally are millable or processible at temperatures ranging from about 175° C. to about 230° C. These copolymers are normally highly crystalline and exhibit a polymer crystallinity from about 40 percent to about 90 percent or greater.

Typically, oxymethylene copolymers are stabilized after manufacture by degradation of unstable molecular ends of the polymer chains to a point where a relatively stable carbon-to-carbon linkage prevents further degradation of each end of the polymer chain. Such degradation of unstable molecular ends is generally effected by hydrolysis, as disclosed, for example, in U.S. Pat. No. 3,219,623 to Berardinelli. Oxymethylene copolymer may also be stabilized by end-capping, again using techniques well known to those skilled in the art, as for example by acetylation with acetic anhydride in the present of a sodium acetate catalyst.

A particularly preferred class of oxymethylene copolymers is commercially available under the trade name CELCON® acetal copolymer. CELCON acetal copolymers typically are copolymers of about 98 weight percent of trioxane and about 2 percent of dioxolane. CELCON is a registered trademark of Hoechst Celanese Corporation. The compositions of the current invention may be made using any commercial grade of CELCON acetal, including CELCON grades U-10, M-25, M-90, M-270 and M-450. CELCON M-25 acetal copolymer has a melt index of about 2.5 g/10 min when tested in accordance with ASTM D1238-82. CELCON M-90 acetal copolymer has a lower molecular weight and melt viscosity than CELCON M-25. CELCON M-270 has an even lower molecular weight and melt viscosity than CELCON M-25.

Oxymethylene terpolymers may also be used in making the self-lubricating compositions of the present invention. These terpolymers contain oxymethylene groups, oxy (higher alkylene) groups such as those corresponding to the general formula:

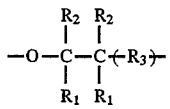

and a different third group which has been interpolymerized with the oxymethylene and oxy(higher alkylene) groups. A terpolymer as described above is typically made by reacting trioxane with a cyclic ether or cyclic acetal and a third monomer which is a bifunctional compounds, such as a diglycide of the formula:

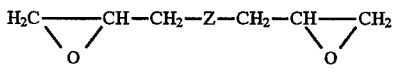

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy) group, preferably one having from 2 to 4 recurring lower alkoxy groups each with 1 or 2 carbon atoms. Examples of suitable bifunctional compounds include the diglycidyl ethers of ethylene glycol, 1,2-propanediol, and 1,4-butanediol with the diglycidyl ether of 1,4-butanediol being preferred. Generally, when preparing such terpolymers, ratios of from 99.89 to 89.0 weight percent trioxane, 0.1 to 10 weight percent of the cyclic ether or cyclic acetal, and 0.01 to 1 weight percent of the bifunctional compound are preferred, based on the total weight of monomers used in forming the terpolymer. A particularly preferred oxymethylene terpolymer is commercially available from Hoechst Celanese Corporation under the name CELCON U10 acetal polymer, made from 1,4-butanediol diglycidyl ether crosslinker, dioxolane and trioxane containing about 0.05 weight percent, 2.0 weight percent, and 97.95 weight percent, respectively, of repeating units derived from these three monomers, based on the total weight of the terpolymer. The oxymethylene-based terpolymers are made and stabilized by methods well known in the art, such as by the addition of antioxidants and formaldehyde and acid scavengers. More detailed descriptions of the methods for making oxymethylene-based terpolymers and their compositions can be found in previously cited patents.

These oxymethylene polymers may be combined in various proportions by melt blending in extruders or similar apparatus to form suitable polymers for preparation of the self-lubricating composition of the present invention. Generally, polyoxymethylene polymers are readily blended with the lubricating system and processing aids when the polymer is in the molten state, i.e., at temperatures of at least about 170° C.

The lubricating system of the present invention may be characterized as containing ultra high molecular weight polyolefin, pentaerythritol tetrastearate and a calcium carbonate. The ultra high molecular weight polyolefin may be a linear polyethylene exhibiting a crystallinity of about 40 percent, a weight-average molecular weight of at least about $3 \times 10^6$ (typically from about $5 \times 10^6$ to about $6 \times 10^6$), an intrinsic viscosity of at least about 28 dl/g (measured by ASTM No. D4020), a bulk density of at least about 0.5 g/cm$^3$ (measured by ASTM No. D1895), and a specific gravity of about 0.93 g/cm$^3$. A particular preferred ultra high molecular weight (UHMW) polyethylene, meeting FDA/USDA compliance, is Hostalert® GUR 415 UHMW polyethylene distributed by Hoechst Celanese Corporation of Somerville, N.J. Generally, the lubricant system of the present invention is characterized as containing at least about 0.1 weight percent of UHMW polyethylene, 0.25 weight percent of PETS, and least about 0.25 weight percent of the calcium carbonate, based on the total weight of the composition. Typically, the lubricant system is characterized as containing from about 0.2 to about 10.0 weight percent of UHMW polyethylene, from about 0.25 to about 2.0 weight percent of PETS, and from about 0.25 to about 4.0 weight percent of the calcium carbonate, based on the total weight of the composition. Preferably, the lubricating system is characterized as containing about 1.5 weight percent of UHMW polyethylene, 1.0 weight percent of PETS, and about 1.0 weight percent of the calcium carbonate, based on the total weight of the composition.

Several additional components may be added to the composition of the present invention to aid lubricity and processing. Generally, the additives may be combined proportionally with the lubricating system and admixed as a package with the thermoplastic polymer or they may be added directly to the composition. These additives may be selected from: (a) at least about 0.25 weight percent of a oxymethylene terpolymer; (b) at least about 0.25 weight percent of a hindered phenol; and (c) at least about 0.05 weight percent of calcium ricinoleate or calcium hydroxystearate, based on the total weight percent of the composition. Typically, these additives may be admixed with the self-lubricating composition in amounts selected from: (a) from about 0.25 to about 2.0 weight percent of a oxymethylene terpolymer; (b) from about 0.25 to about 0.75 weight percent of a hindered phenol; and (c) from about 0.05 to about 0.3 weight percent of calcium ricinoleate or calcium hydroxystearate, based on the total weight percent of the composition. Preferably, these additives are admixed with the composition in amounts of: (a) about 0.5 weight percent of a oxymethylene terpolymer; (b) about 0.4 weight percent of a hindered phenol; and (c) 0.01 weight percent of calcium ricinoleate or calcium hydroxystearate, based on the total weight percent of the composition. The addition of these processing aids will typically result in a concomitant adjustment in the amount of thermoplastic resin. Other processing aids known to those skilled in the art, such as silicone or fluoropolymer mold sprays may be used to aid molding.

The calcium carbonate useful in the invention is characterized as exhibiting a particle size of about 0.6 μm, a surface area of about 7 m$^2$/gm, a bulk density of about 25 lb/ft$^3$, and a specific gravity of about 2.7. A preferred calcium carbonate is Super-Pflex® 200 available from Pfizer, Inc.

The hindered phenol useful in the present invention are generally known as antioxidants or free radical inhibitors. At least one of 2,2'-methylenebis(4-methyl-6-t-butylphenol), hexamethyleneglycol-bis(3,5-di-t-butyl-4-hydroxyhydrocinnamate), tetrabis[methylene(3,5-di-t-butyl-4-hydroxyhydrocinnamate)]methane, triethyleneglycol-bis-3-(3-t-butyl-4-hydroxy-5-methylphenyl) propionate, 1,3,5-trimethyl-2,4,6-tris(3,5-di-t-butyl-4-hydroxy-benzyl)-benzen, p-octadecyl-3-(4'-hydroxy-3', 5'-di-t-butyl-phenol)propionate, 4,4'-methylenebis(2,6-di-t-butylphenol), 4,4'-butylidene-bis-(6-t-butyl-3-methylphenol), 2,2'-thiodiethyl-bis-[3-(3,5-di-t-butyl-4-hydroxyphenol)]propionate, di-stearyl-3,5-di-t-butyl-4-hydroxybenzylphosphonate and 2-t-butyl-6-(3-t-butyl-5-methyl-2-hydroxybenzyl)-4-methylphenylacrylate may be used. However, the useful hindered phenols are not limited to these compounds. Other hindered or stereo-obstructing phenols of the same kind as the above described ones are effective. Of them, hexamethyleneglycol-bis(3,5-di-t-butyl-4-hydroxyhydrocinnamate), for example Irganox® 259 available from Ciba-Geigy, tetrakis[methylene(3, 5-di-t-butyl-4-hydroxyhydrocinnamate)]methane, for example Irganox 1010 made by Ciba-Geigy and triethyleneglycol-bis-3-(3-t-butyl-4-hydroxy-5-methylphenyl) propionate, for example Irganox 245 made by Ciba-Geigy are effective. A preferred hindered phenol is hexamethyleneglycol-bis(3,5-di-t-butyl-4-hydroxyhydrocinnamate).

The following examples are general illustrations of methods for preparing the polymeric composition of the invention. They are provided for purposes of exemplification only as should be appreciated from the foregoing discussion.

EXAMPLE 1

To prepare a blend of the self-lubricating composition, containing 7.9 weight percent of the lubricating system, the following components were utilized:

a) 90 lbs. of oxymethylene copolymer unstabilized flake;

b) 4.9 lbs. of UHMW polyethylene;

c) 1.5 lbs. of oxymethylene terpolymer;

d) 1.0 lbs. of pentaerythritol tetrastearate (PETS);

e) 2.0 lbs. of calcium carbonate;

f) 0.1 lbs. of calcium ricinoleate; and g) 0.5 lbs. of preferred hindered phenol The components were tumbled in a barrel followed by high speed mixing for 30 sec. in a Henschel mixer to form a mixture. The mixture was extruded into strands in a Werner and Pfleiderer twin screw ZSK extruder, heated and purged with polyacetal pellets. The extruder zones were operated at 372° to 387° F., the melt temperature was 415° F. and under a vacuum of 27 in. Hg, and the screw speed was 150 rpm. Strands of extrudate were produced at a rate of 38 lbs/hr. Thereafter, the strands were quenched in cold water and cut into pellets. The pellets were injection molded at conventional pressure, velocity and cycle time settings, a nozzle temperature setting of 360° to 420° F., and barrel temperature setting of 350° to 420° F. to form 1.25 in diameter disks, each weighing about 7 gm, for mechanical and tribological analyses.

The disks were prepared for surface wear resistance and torque analyses by cleaning in a bath of methanol, drying in air, and weighing to about one-tenth (1/10) of a milligram. These disks were tested according to a Pin-on-Disk Wear Test. In performing the tests, a machined Nylatron Nylon pin with a spherical tip having a radius of 0.187 inches was mounted on the upper spindle of a Falex Friction and Wear Test Machine, Model Multi-Specimen at a distance of 0.469 inches from the center of the test disks, which was mounted on the lower spindle. A load of 20 pounds was applied to the test disks by means of an air cylinder pressed the disk against the spherical pin tip. The rotational velocity was 425 rpm (104.3 ft/min). During the test, a stream of air at 40 standard cubic feet per hour (SCFH) and a distance of 2 inches was directed against the disk surface to remove debris. Testing times ranged from 0.5 to 65 hours. After testing, the pin tip and disk were separated from contact and the disk was removed, air brushed to remove loose debris, and weighed for weight loss, i.e., surface wear.

Torque ($\Gamma$), measured during the test, was converted into a coefficient of friction ($f$) by application of the equation:

$$f = \Gamma(2.137/20)$$

The factor 2.137 is a specific coefficient for this machine. Results of surface wear and coefficients of friction are in Table I.

Comparative Example 2

As a comparative example, a polymeric composition was prepared by substituting 1.5 wt % polytetrafluoroethylene (PTFE) for the lubricating system of Example 1, the following components were utilized:

a) 213.84 lbs of oxymethylene copolymer unstabilized flake (97.2 wt %);

b) 1.1 lbs of oxymethylene terpolymer pellets (0.5 wt %);

c) 199.76 gm of N,N'-ethylene bis-stearamide (0.2 wt %);

d) 1.1 lbs of preferred hindered phenol (0.5 wt %);

e) 99.88 gm of calcium ricinoleate (0.1 wt %); and f) 3.3 lbs of the PTFE (1.5 wt % of total composition)

The components were mixed, extruded and molded according to the process of Example 1 to form 7 gm disks for weight loss and coefficient of friction analyses. Results of the analyses are in Table I.

Comparative Example 3

As a comparative example, a polymeric composition was prepared by substituting 3.0 wt % PTFE for the lubricating system of Example 1, the following components were utilized:

a 210.54 lbs of oxymethylene copolymer unstabilized flake;

b 1.1 lbs of oxymethylene terpolymer pellets;

c) 199.76 gm of N,N'-ethylene bis-stearamide;

d) 1.1 lbs of preferred hindered phenol;

e) 99.88 gm of calcium ricinoleate; and f) 6.6 lbs of the PTFE (3.0 wt % of total composition)

The components were mixed, extruded and molded according to the process of Example 1 to form 7 gm disks for weight loss and coefficient of friction analyses. Results of the analyses are in Table I.

Results of analyses illustrate that after 0.5 hours of pin-on-disk testing, Example 1 samples exhibited an average weight loss of 1.1 mg; after 17 hours of testing, the disks exhibited an average weight loss of 4.3 mg and a coefficient of friction of 0.075; and after a total of 65 hours of testing, disks exhibited an average weight loss of 5.4 mg.

Results of wear testing of disks prepared from compositions containing PTFE, as the lubricating system, exhibited surface wear as well as coefficients of friction significantly higher than the invention.

To demonstrate the the wear performance of the composition in the presence and absence of components of the lubricating system, several formulations were prepared in accordance with the method of Example 1, above, as follows:

EXAMPLE 4

| Component | wt % |
|---|---|
| oxymethylene copolymer | 95.5 |
| oxymethylene terpolymer | 0.5 |
| preferred hindered phenol | 0.4 |
| calcium ricinoleate | 0.1 |
| UHMW polyethylene | 1.5 |
| PETS | 1.0 |
| calcium carbonate | 1.0 |

EXAMPLE 5

| Component | wt % |
|---|---|
| oxymethylene copolymer | 97 |
| oxymethylene terpolymer | 0.5 |
| preferred hindered phenol | 0.4 |
| calcium ricinoleate | 0.1 |
| UHMW polyethylene | 0 |
| PETS | 1.0 |
| calcium carbonate | 1.0 |

EXAMPLE 6

| Component | wt % |
|---|---|
| oxymethylene copolymer | 96.5 |
| oxymethylene terpolymer | 0.5 |
| preferred hindered phenol | 0.4 |
| calcium ricinoleate | 0.1 |
| UHMW polyethylene | 1.5 |
| PETS | 0 |
| calcium carbonate | 1.0 |

EXAMPLE 7

| Component | wt % |
|---|---|
| oxymethylene copolymer | 96.5 |
| oxymethylene terpolymer | 0.5 |
| preferred hindered phenol | 0.4 |
| calcium ricinoleate | 0.1 |
| UHMW polyethylene | 1.5 |
| PETS | 1.0 |
| calcium carbonate | 0 |

EXAMPLE 8

| Component | wt % |
|---|---|
| oxymethylene copolymer | 98.7 |
| oxymethylene terpolymer | 0.5 |
| preferred hindered phenol | 0.5 |
| calcium ricinoleate | 0.1 |
| N,N'-ethylene bis-stearamide | 0.2 |
| UHMW polyethylene | 0 |
| PETS | 0 |
| calcium carbonate | 0 |

EXAMPLE 9

| Component | wt % |
|---|---|
| oxymethylene copolymer | 96.6 |
| oxymethylene terpolymer | 0.5 |
| preferred hindered phenol | 0.4 |
| calcium ricinoleate | 0.1 |
| UHMW polyethylene | 0.4 |
| PETS | 1.0 |
| calcium carbonate | 1.0 |

EXAMPLE 10

| Component | wt % |
|---|---|
| oxymethylene copolymer | 96.2 |
| oxymethylene terpolymer | 0.5 |
| preferred hindered phenol | 0.4 |
| calcium ricinoleate | 0.1 |
| UHMW polyethylene | 0.8 |
| PETS | 1.0 |
| calcium carbonate | 1.0 |

The compositions of Examples 4 through 10 were molded into test disks and wear tested according to a Pin-on-Disk Wear Test in accordance with the procedure of Example 1. The results of the test are illustrated in Table I, below:

TABLE I

Wt. Loss, mg[1]/Coefficient of Friction

| Ex | Lub. System, wt % | Test Time, hrs. | | | |
|---|---|---|---|---|---|
| | | 0.5 | 1.5 | 7 | 65 |
| 1 | 7.9 | 1.1 | 1.4 | 4.3/0.075 | 5.4 |
| 2 | 1.5 PTFE | 8.1 | 15.9 | 122/0.14 | 181 |
| 3 | 3.0 PTFE | 3.4 | 15.9 | 87/0.13 | 155 |
| 4 | 3.5 | 1.8 | 2.1 | 4.2 | 8.6 |
| 5 | 2.0 | n/d[2] | 2 | 45 | n/d |
| 6 | 2.5 | n/d | 4.1 | 167 | n/d |
| 7 | 2.5 | n/d | 2.4 | 64 | n/d |
| 8 | 0 | n/d | 113 | 260 | n/d |
| 9 | 2.4 | n/d | 3.0 | 6.9 | 30.1 |
| 10 | 2.8 | n/d | 2.8 | 7.8 | 12.4 |

[1]@ load of 20 lbs; velocity of 104.3 ft/min
[2]n/d: no data

The Table illustrates that the composition of Examples 4, 9 and 10 containing UHMW polyethylene, calcium carbonate and PETS, provides superior lubrication properties after 17 and 65 hours of wear testing in comparison to the composition containing less than all three components.

I claim:

1. A self-lubricating composition suitable for forming a low friction, shaped article, comprising a melt blend of from about 70 to about 99.5 weight percent of polyoxymethylene and from about 30 to about 0.5 weight percent of a lubricating system, based on the total weight of the composition, wherein the lubricating system comprises an ultra high molecular weight polyolefin, pentaerythritol tetrastearate and calcium carbonate.

2. The composition according to claim 1, wherein the polyoxymethylene is selected from the group consisting of:

(i) oxymethylene homopolymers;

(ii) oxymethylene copolymers comprising about 85 to about 99.9 percent oxymethylene repeat units interspersed with repeat units of the formula:

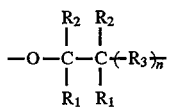

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive;

(iii) oxymethylene terpolymers, which are the reaction product of trioxane and, a cyclic ether and/or a cyclic acetal, and a diglycidyl ether crosslinker of the formula:

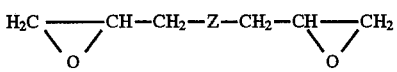

wherein Z is selected from the group consisting of a carbon-to-carbon bond, oxygen, an oxyalkoxy unit of 1 to 8 carbon atoms, and an oxypoly(lower alkoxy) unit; and (iv) mixtures of (i), (ii) and (iii).

3. The composition according to claim 2, wherein the polyolefin is polyethylene.

4. The composition according to claim 3, wherein the polyethylene exhibits a crystallinity of at least about 40 percent, a molecular weight of at least about $3 \times 10^6$, an intrinsic viscosity of at least about 28 dl/g, a bulk density of about 0.5 g/cm$^3$ and a specific gravity of at least about 0.93.

5. The composition according to claim 4, comprising from about 85 to about 99 weight percent of the polyoxymethylene and from about 15 to about 1 weight percent of the lubricating system.

6. The composition according to claim 5, further comprising: (a) about 0.1 weight percent of a oxymethylene terpolymer; (b) about 0.1 weight percent of a hindered phenol; and (c) about 0.05 weight percent of calcium ricinoleate or calcium hydroxystearate, based on the total weight percent of the composition.

7. A shaped article prepared from the self-lubricating composition according to claim 6, exhibiting a weight loss of about 4.2 mg after 17 hours of wear at a revolutionary velocity of 104.3 ft/min and an applied load of about 20 lbs, and a coefficient of friction of about 0.075.

8. A method of improving the surface wear resistance of a polyoxymethylene shaped article, comprising the steps of:

(a) preparing a melt blend composition, comprising from about 70 to about 99.5 weight percent of polyoxymethylene, and from about 30 to about 0.5 weight percent of a lubricating system, based on the total weight of the composition, wherein said lubricating system comprises an ultra high molecular weight polyolefin, pentaerythritol tetrastearate and calcium carbonate; and b) fabricating said composition into a shaped article, wherein the article exhibits an improved coefficient of friction and surface wear resistance.

9. The method according to claim 8, wherein the polyoxymethylene is selected from the group consisting of:

(i) oxymethylene homopolymers;

(ii) oxymethylene copolymers comprising about 85 to about 99.9 percent oxymethylene repeat units interspersed with repeat units of the formula:

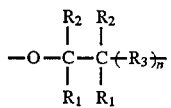

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive;

(iii) oxymethylene terpolymers, which are the reaction product of trioxane and, a cyclic ether and/or a cyclic acetal, and a diglycidyl ether crosslinker of the formula:

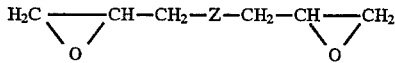

wherein Z is selected from the group consisting of a carbon-to-carbon bond, oxygen, an oxyalkoxy unit of 1 to 8 carbon atoms, and an oxypoly(lower alkoxy) unit; and (iv) mixtures of (i), (ii) and (iii).

10. The method according to claim 9, wherein the composition comprises from about 85 to about 99 weight percent of the polyoxymethylene, and from about 15 to about 1 weight percent of the lubricating system.

11. The method according to claim 10, wherein the polyoxymethylene is oxymethylene copolymers comprising about 85 to about 99.9 percent oxymethylene repeat units interspersed with repeat units of the formula:

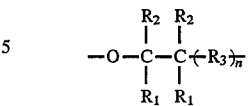

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive.

12. The method according to claim 11, wherein the lubricating system comprises at least about 0.25 weight percent of ultra high molecular weight polyethylene, at least about 0.25 weight percent of pentaerythritol tetrastearate and at least about 0.25 weight percent of calcium carbonate, based on the total weight percent of the composition.

13. The method according to claim 12, wherein the composition further comprises: (a) about 0.5 weight percent of a oxymethylene terpolymer; (b) about 0.4 weight percent of a hindered phenol; and (c) about 0.1 weight percent of calcium ricinoleate or calcium hydroxystearate, based on the total weight percent of the composition.

14. A shaped article prepared according to the method of claim 13, wherein the article exhibits a weight loss of about 4.3 mg after 17 hours of wear at a revolutionary velocity of 104.3 ft/min at an applied load of about 20 lbs, and a coefficient of friction of less than about 0.05.

15. The shaped article according to claim 14, wherein the article is selected from the group consisting of bearings, gears, cams, rollers, sliding plates, pulleys, levers, guides and conveyor belt links.

* * * * *